United States Patent
Xu

(10) Patent No.: US 12,219,488 B2
(45) Date of Patent: Feb. 4, 2025

(54) METHODS FOR POWER SAVING SIGNAL TRANSMISSION, BASE STATION, AND TERMINAL

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 596 days.

(21) Appl. No.: 17/486,843

(22) Filed: Sep. 27, 2021

(65) Prior Publication Data

US 2022/0015037 A1   Jan. 13, 2022

Related U.S. Application Data

(63) Continuation of application No. PCT/CN2019/080683, filed on Mar. 29, 2019.

(51) Int. Cl.
*H04W 52/02* (2009.01)
*H04W 72/23* (2023.01)

(52) U.S. Cl.
CPC ....... *H04W 52/0235* (2013.01); *H04W 72/23* (2023.01)

(58) Field of Classification Search
CPC ... H04W 72/23; H04W 76/28; H04W 52/146; H04W 52/0235; H04W 52/0219; H04W 52/325; H04W 52/02; H04W 72/0473; H04W 52/143; H04W 52/00
See application file for complete search history.

(56) References Cited

U.S. PATENT DOCUMENTS

| | | | |
|---|---|---|---|
| 9,706,422 B2* | 7/2017 | Dalsgaard | H04W 24/08 |
| 2012/0275364 A1 | 11/2012 | Anderson et al. | |
| 2014/0198696 A1 | 7/2014 | Li et al. | |
| 2017/0290046 A1* | 10/2017 | Sun | H04W 72/0466 |
| 2018/0098287 A1 | 4/2018 | Ang et al. | |

(Continued)

FOREIGN PATENT DOCUMENTS

| | | |
|---|---|---|
| CN | 103283283 | 9/2013 |
| CN | 103636264 | 3/2014 |

(Continued)

OTHER PUBLICATIONS

JPO, Office Action for JP Application No. 2021-557692, Jan. 27, 2023.

(Continued)

*Primary Examiner* — Allahyar Kasraian
(74) *Attorney, Agent, or Firm* — Hodgson Russ LLP

(57) ABSTRACT

Methods for power saving signal transmission, a base station, and a terminal device are provided. A method for power saving signal transmission includes the following. A base station transmits first indication signaling, where the first indication signaling is used for notifying a size of downlink control information (DCI). The DCI carries power saving information of one of more uses. The size of the DCI includes an amount of bits occupied by the DCI, and the amount of bits has a correspondence relationship with an amount of users. The base station transmits the DCI.

25 Claims, 5 Drawing Sheets

(56) References Cited

U.S. PATENT DOCUMENTS

| | | | |
|---|---|---|---|
| 2019/0239189 A1 | 8/2019 | Hwang et al. | |
| 2021/0051759 A1* | 2/2021 | Zhou | H04W 76/28 |
| 2021/0075537 A1* | 3/2021 | Fröberg Olsson | H04W 72/53 |
| 2021/0345241 A1* | 11/2021 | Zhu | H04L 5/0053 |

FOREIGN PATENT DOCUMENTS

| | | |
|---|---|---|
| CN | 108966322 | 12/2018 |
| WO | 2018074740 | 4/2018 |
| WO | 2018174635 A1 | 9/2018 |
| WO | 2018204799 A1 | 11/2018 |
| WO | 2020205652 | 10/2020 |

OTHER PUBLICATIONS

CNIPA, Second Office Action for CN Application No. 202111109382. 8, Feb. 5, 2023.

EPO, Communication for EP Application No. 19923132.5, Oct. 27, 2022.

CIPO, Office Action for CA Application No. 3135305, Nov. 24, 2022.

CNIPA, First Office Action for CN Application No. 202111109382. 8, Nov. 28, 2022.

Ericsson, "Techniques for UE Power Saving", 3GPP TSG RAN WG1 Meeting #96, Feb. 25, 2019, R1-1902935, Greece.

Qualcomm Incorporated, "Potential Techniques for UE Power Saving", 3GPP TSG RAN WG1 #96, Feb. 25, 2019, R1-1903016, Greece.

EPO, Extended European Search Report for European Patent Application No. 19923132.5, Mar. 4, 2022.

IPI, First Examination Report for Indian Patent Application No. 202127047793, Apr. 28, 2022.

Qualcomm Incorporated et al., "Wake-Up Signaling for C-DRX Mode," 3GPP TSG RAN WG2 NR #99, R2-1709652, Aug. 2017, 5 pages.

WIPO, International Search Report for PCT/CN2019/080683, Dec. 30, 2019.

IPI, Hearing Notice for IN Application No. 202127047793, Jun. 21, 2024.

* cited by examiner

METHODS FOR POWER SAVING SIGNAL TRANSMISSION, BASE STATION, AND TERMINAL

CROSS REFERENCE TO RELATED APPLICATION(S)

This application is a continuation of International Application No. PCT/CN2019/080683, filed on Mar. 29, 2019, the disclosure of which is hereby incorporated by reference in its entirety.

TECHNICAL FIELD

This disclosure relates to the field of communication technology, and more particularly to methods for power saving signal transmission, a base station, and a terminal.

BACKGROUND

In a long term evolution (LTE) system, a base station can transmit a power saving signal to a terminal, to instruct the terminal not to perform PDCCH detection during an active period of discontinuous reception (DRX).

However, there are various types of power saving signals, and each type has its own advantages and disadvantages. If the same power saving signal is used for different scenarios, it is impossible to achieve an optimal power-saving effect. Therefore, there is a need for a flexible manner of power saving signal transmission.

SUMMARY

In a first aspect of implementations of the disclosure, a method for power saving signal transmission is provided. The method includes the following. A base station transmits first indication signaling, where the first indication signaling is used for notifying a size of downlink control information (DCI), the DCI carries power saving information of one or more users, the size of the DCI includes an amount of bits occupied by the DCI, and the amount of bits has a correspondence relationship with an amount of users. The base station transmits the DCI according to the first indication signaling.

In a second aspect of implementations of the disclosure, a method for power saving signal transmission is provided. The method includes the following. A terminal receives first indication signaling, where the first indication signaling is used for notifying a size of downlink control information (DCI), the DCI carries power saving information of one or more users, the size of the DCI includes an amount of bits occupied by the DCI, and the amount of bits has a correspondence relationship with an amount of users. The terminal receives the DCI according to the first indication signaling.

In a third aspect of implementations of the disclosure, a base station is provided. The base station includes a transceiver, a memory, and a processor. The memory stores executable instructions which, when executed by the processor, become operational with the transceiver to: transmit first indication signaling, where the first indication signaling is used for notifying a size of downlink control information (DCI), the DCI carries power saving information of one or more users, the size of the DCI includes an amount of bits occupied by the DCI, and the amount of bits has a correspondence relationship with an amount of users; transmit the DCI.

In a fourth aspect of implementations of the disclosure, a terminal is provided. The terminal includes a transceiver, a memory, and a processor. The memory stores executable instructions which, when executed by the processor, become operational with the transceiver to: receive first indication signaling, where the first indication signaling is used for notifying a size of downlink control information (DCI), the DCI carries power saving information of one or more users, the size of the DCI includes an amount of bits occupied by the DCI, and the amount of bits has a correspondence relationship with an amount of users; receive the DCI according to the first indication signaling.

BRIEF DESCRIPTION OF THE DRAWINGS

In order to describe technical solutions of implementations or the related art more clearly, the following will give a brief introduction to the accompanying drawings used for describing implementations or the related art. Apparently, the accompanying drawings hereinafter described are merely some implementations of the disclosure. Based on these drawings, those of ordinary skill in the art can also obtain other drawings without creative effort.

DETAILED DESCRIPTION

Figure 1:
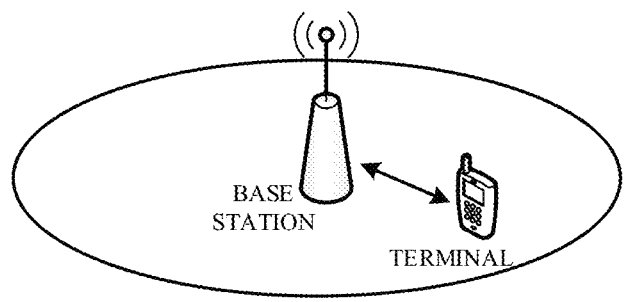
FIG. 1 is a schematic architectural diagram of a communication system provided in implementations of the disclosure.

The terms "include", "comprise", and "have" as well as variations thereof in the specification, the claims, and the above accompanying drawings are intended to cover non-exclusive inclusion. For example, a process, method, system, product, or apparatus including a series of steps or units is not limited to the listed steps or units, and instead, it can optionally include other steps or units that are not listed; alternatively, other steps or units inherent to the process, method, product, or device can also be included.

With increase in communication requirements of users, communication technology and hardware of a terminal are developing rapidly. However, before battery technology achieves great development, power consumption of a battery of the terminal cannot be ignored.

Considering power saving of the terminal, a discontinuous reception (DRX) mechanism has been introduced. In a basic DRX mechanism, a DRX cycle is configured for a terminal which is in a radio resource control connected (RRC_CONNECTED) state. The DRX cycle includes a dormant period and an active period. In the active period, the terminal monitors and receives a physical downlink control channel (PDCCH). In the dormant period, the terminal does not receive PDCCH to reduce power consumption. In addition, transmission of a paging message also follows a DRX mechanism of an RRC idle state. In this scenario, the DRX cycle is a cycle of the paging message. However, in a $5^{th}$ generation (5G) project or a long term evolution (LTE) project, the terminal is only scheduled opportunistically during a periodic active period. Even when service load of the terminal is very low, the terminal is scheduled only in a few DRX cycles. For a paging message adopting the DRX mechanism, the terminal has fewer opportunities to receive the paging message. Therefore, after the terminal is configured with the DRX mechanism, there can be a situation where no data scheduling is detected during PDCCH detections in a majority of active periods. If the terminal performs PDCCH blind detection when there is no data scheduling, it will result in a waste of power in detection. Therefore, the base station can determine whether it is necessary to schedule the terminal in the active period. If necessary, the base station transmits a power saving signal to the terminal to wake up the terminal; otherwise, the base station can instruct the terminal not to perform PDCCH detection during the active period.

The power saving signal can be a sequence-based signal or a PDCCH-based signal. A PDCCH carrying a power saving signal can continue to adopt an existing PDCCH design and therefore is conducive to compatibility and multiplexing with an existing system and other channels. A PDCCH-based power saving signal includes a single-user dedicated PDCCH-based power saving signal and a multi-user multiplexed PDCCH-based power saving signal. The single-user dedicated PDCCH-based power saving signal carries a power saving signal of one user, and the multi-user multiplexed PDCCH-based power saving signal can carry power saving signals of multiple users. These two kinds of power saving signals both have their own advantages and disadvantages in terms of resource occupancy, indication efficiency, and indication capacity. Therefore, a more flexible manner to use the power saving signal is needed.

1) In terms of resource occupancy, since the single-user dedicated PDCCH-based power saving signal carries only power-saving information of a single user, an amount of bits of PDCCH downlink control information (DCI) used for carrying the power saving signal is small, and only a low PDCCH aggregation level is required to ensure a good transmission performance. Therefore, a resource occupancy rate of a single PDCCH-based power saving signal/channel is low. On the contrary, since the multi-user multiplexed PDCCH-based power saving signal needs to carry power-saving information of multiple users, an amount of bits of PDCCH DCI of a single PDCCH-based power saving signal/channel is large. A large amount of users lead to a large amount of bits of DCI, and a high PDCCH aggregation level is required to ensure an adequate transmission performance. Therefore, for the multi-user multiplexed PDCCH-based power saving signal, a resource occupancy rate of a single PDCCH-based power saving signal/channel is high.

2) In terms of indication efficiency, the single-user dedicated PDCCH-based power saving signal carries power-saving information of a single user, but a PDCCH payload needs to carry 24 cyclic redundancy check (CRC) bits. In order to ensure channel coding performance, in case of fewer bits for power-saving information, some padding bits even need to be added, and therefore valid bits occupy a small proportion of total transmission bits, which is low in indication efficiency. On the contrary, the multi-user multiplexed PDCCH-based power saving signal can carry power-saving information of multiple users. Although a PDCCH payload still needs to carry 24 CRC bits, an average bit overhead for each user is: (single-user power-saving information bits+24)÷an amount of users. Therefore, the multi-user multiplexed PDCCH-based power saving signal is high in indication efficiency.

3) In terms of indication capacity, the single-user dedicated PDCCH-based power saving signal is low in indication capacity, whereas the multi-user multiplexed PDCCH-based power saving signal is high in indication capacity.

In practice, since a system load and/or an amount of terminals is changing continuously, it is impossible to adapt to various practical situations if a single type of PDCCH-based power saving signal is adopted.

For the convenience of description, implementations of the disclosure will take a 5G system as an example. Those skilled in the art should appreciate that, implementations of the disclosure can also be applied to an existing communication system and a more advanced communication system in the future such as a $6^{th}$ generation (6G) system and a $7^{th}$ generation (7G) system, which is not limited herein.

The following will describe in detail methods for power saving signal transmission and related devices of implementations of the disclosure with reference to the accompanying drawings.

FIG. 1 is a schematic architectural diagram of a communication system provided in implementations of the disclosure. The communication system may include a base station and at least one terminal. The terminal can also be referred to as a user equipment (UE).

The base station may be an evolved Node B (eNB), a Node B (NB), a base station controller (BSC), a base transceiver station (BTS), a home evolved NodeB (or home Node B) (HNB), a baseband unit (BBU), or the like. The base station may also be referred to by those skilled in the art as a base station transceiver, a wireless base station, a wireless transceiver, a transceiver function, a base station sub-system (BSS), or some other suitable terms. The base station may use a PDCCH to carry and schedule DCI, and use the DCI to carry a power saving signal.

The terminal may include a cellular phone, a smart phone, a session initiation protocol (SIP) phone, a laptop computer, a personal digital assistant (PDA), a satellite radio, a global positioning system (GPS), a multimedia device, a video device, a digital audio player (such as an MP3 player), a camera, a game console, or any other device with similar functions. The terminal may also be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handheld device, a user agent, a mobile client, a client, or some other suitable terms. The terminal may receive a notification message from the base station, to obtain a type of the power saving signal determined by the base station.

Figure 2:
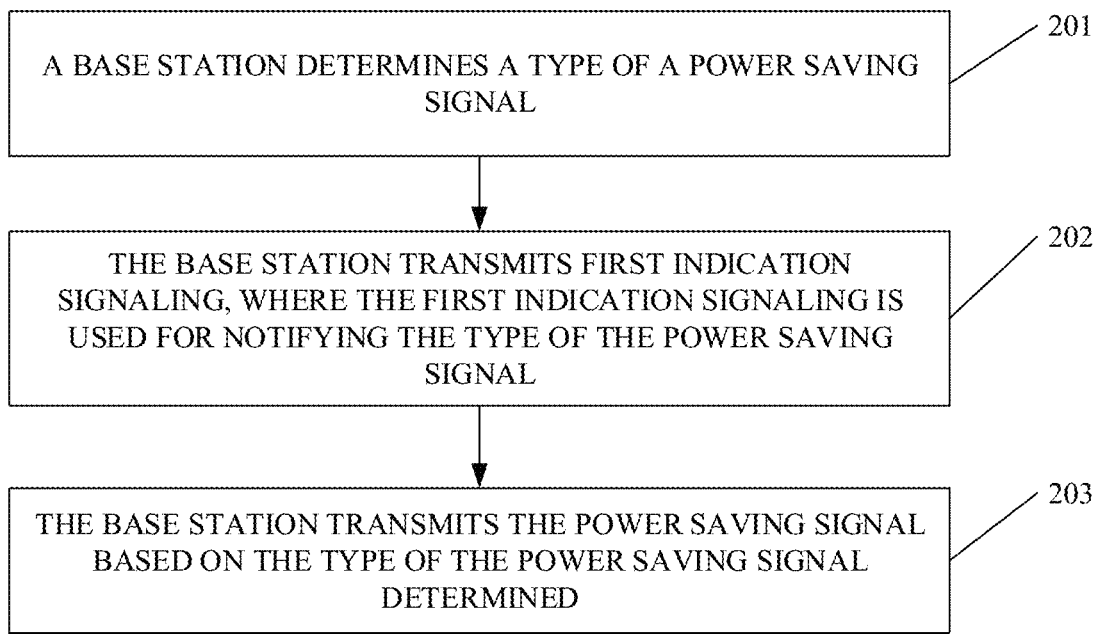
FIG. 2 is a schematic flowchart of a method for power saving signal transmission provided in implementations of the disclosure.

FIG. 2 is a schematic flowchart of a method for power saving signal transmission provided in implementations of the disclosure. In this implementation, the method includes the following.

At block 201, a base station determines a type of a power saving signal.

The type of the power saving signal includes, but is not limited to, a first PDCCH-based power saving signal used for transmitting power-saving information of a single user ("single-user power-saving information" for short) and a second PDCCH-based power saving signal used for transmitting power-saving information of multiple users ("multi-user power-saving information" for short). When power-saving information of two users needs to be transmitted simultaneously, the second PDCCH-based power saving signal can be adopted.

The first PDCCH-based power saving signal may also be referred to as a single-user dedicated PDCCH-based power saving signal, in which a power saving signal of one user is carried.

The second PDCCH-based power saving signal may also be referred to as a multi-user multiplexed PDCCH-based power saving signal, which has more bits and can carry power saving signals of multiple users. Each user corresponds to one or more indication bits in PDCCH DCI. The base station may indicate, through configuration, indication bit(s) to be used by each user.

The base station may determine the type of the power saving signal according to a system load and/or an amount of terminals.

For example, when a present system load is low, the base station may determine to use the first PDCCH-based power saving signal. When the present system load is high, the base station may determine to use the second PDCCH-based power saving signal. For another example, when the amount of terminals is small, for example, there is only one user or a few users in a present system, the single-user dedicated PDCCH-based power saving signal is more advantageous. When an amount of users is small, even though the single-user dedicated PDCCH-based power saving signal is adopted, only a few PDCCH-based power saving signals corresponding to these users are required. On the contrary, if the multi-user multiplexed PDCCH-based power saving signal is adopted, since more bits in the PDCCH DCI are reserved for carrying power-saving information of more users, there may be a waste of a large amount of indication bits when the amount of users is small.

When the amount of terminals is large, the multi-user multiplexed PDCCH-based power saving signal is more advantageous. Since one PDCCH can carry power-saving indication information of multiple users, one or more PDCCHs can meet power-saving information transmission requirements of all users in a system, which is high in indication efficiency and indication capacity and low in resource occupancy. On the contrary, the single-user dedicated PDCCH-based power saving signal is low in indication efficiency, and power-saving information of some users may not be able to be transmitted due to insufficient dedicated PDCCH channels in a system.

At block 202, the base station transmits first indication signaling.

The first indication signaling is used for notifying the type of the power saving signal.

After determining the type of the power saving signal, the base station can notify a terminal. The terminal receives power-saving information, and performs PDCCH monitoring according to an indication of the power-saving information, thereby achieving the purpose of power saving.

In some implementations, the first indication signaling may include, but is not limited to, broadcast signaling, RRC dedicated signaling, or medium access control control-element (MAC CE) signaling.

In some implementations, at least one bit in the first indication signaling is indicative of the type of the power saving signal.

The base station can adopt at least one bit in the first indication signaling to indicate the type of the power saving signal determined by the base station.

For example, one bit can be used for indication. If the value of the bit is 0, it indicates that the first PDCCH-based power saving signal (that is, the single-user dedicated PDCCH-based power saving signal) is adopted. If the value of the bit is 1, it indicates that the second PDCCH-based power saving signal (that is, the multi-user multiplexed PDCCH-based power saving signal) is adopted, and vice versa, and implementations of the disclosure are not limited in this regard. Alternatively, more bits (such as two bits) may be used for indication, and implementations of the disclosure are also not limited in this regard.

In some implementations, the method includes the following. Upon determining to adopt the first PDCCH-based power saving signal, the base station can scramble a PDCCH by using a cell radio network temporary identifier (C-RNTI), which has been allocated to the terminal when the terminal enters an RRC_connected state, or allocate an RNTI and use the RNTI to scramble the PDCCH. The allocated RNTI is different from the C-RNTI. The RNTI may be used as identifier information that is common to multiple users.

In other implementations, the method includes the following. Upon determining to adopt the second PDCCH-based power saving signal, the base station can allocate an RNTI and use the RNTI to scramble the PDCCH. The RNTI may be used as identifier information that is common to multiple users.

In some implementations, the method includes the following. The base station can indicate a location of power-saving information of a user in DCI. In this scenario, the type of the power saving signal is the second PDCCH-based power saving signal. The second PDCCH-based power saving signal can include power-saving information of multiple users. For a particular user, such as user A, the base station may inform user A of a location of power-saving information of user A in DCI, such that user A can obtain the power-saving information thereof from the indicated location.

At block 203, the base station transmits the power saving signal based on the type of the power saving signal determined.

In this implementation, operations at block 202 may be executed separately, or may be executed in sequence with other operations, and implementations of the disclosure are not limited in this regard.

In addition, allocation of an RNTI and an indication of the location of power-saving information of a user in DCI may be implemented by adopting the first indication signaling used for indicating the type of the power saving signal, or by adopting other signaling, and implementations of the disclosure are not limited in this regard. When the same indication signaling is adopted, a single piece of signaling is high in capacity and high in indication efficiency. When different pieces of signaling are adopted respectively, a single piece of signaling is low in capacity and low in indication efficiency, but is high in processing speed. Therefore, different manners may be selectively adopted according to user requirements and the system load.

In some implementations, before operations at block 201, the method further includes the following. If the base station fails to notify the type of the power saving signal, the base station can transmit the power saving signal based on a preset type of power saving signal. If the type of the power saving signal determined according to the system load and/or the amount of terminals is different from the preset type, a type of power saving signal currently used may be changed. After a current DRX cycle ends, the base station can continue to adopt the preset type of power saving signal in subsequent DRX cycles, or adopt a type of power saving signal determined to be used in the current DRX cycle, and implementations of the disclosure are not limited in this regard.

In this implementation, operations at block 202 may be executed separately, or may be executed in sequence with other operations, and implementations of the disclosure are not limited in this regard.

According to this implementation, the base station flexibly determines the type of the power saving signal to be used. After the determined type of the power saving signal is notified to the terminal, the determined type of the power saving signal, which best meets requirements of a current scenario, can be adopted flexibly. As such, it is possible to make full use of advantages of various types of power saving signals, to achieve optimized transmission of power saving signals for different numbers of terminals, which can improve working efficiency and performance of a system, thereby providing better user experience in communication.

Figure 3:
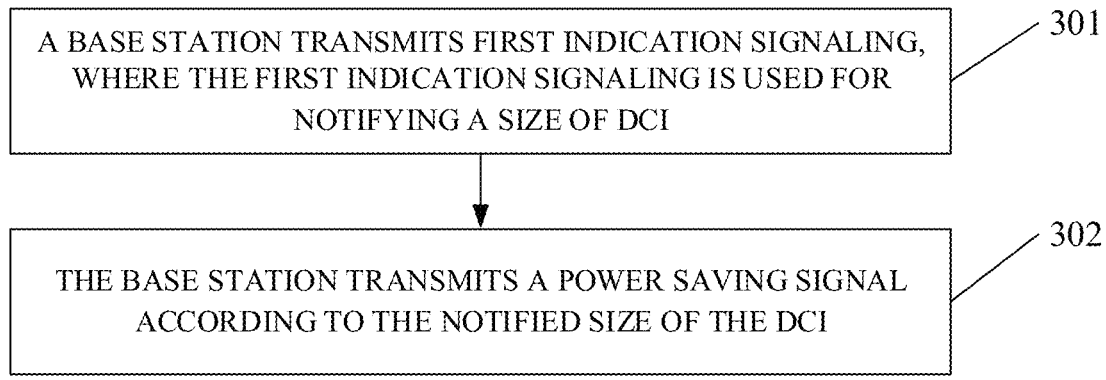
FIG. 3 is a schematic flowchart of a method for power saving signal transmission provided in other implementations of the disclosure.

FIG. 3 is a schematic flowchart of a method for power saving signal transmission provided in other implementations of the disclosure. In this implementation, the method includes the following.

FIG. 3 is a schematic flowchart of a method for power saving signal transmission provided in other implementations of the disclosure. The method includes the following.

At block 301, a base station transmits first indication signaling.

The first indication signaling is used for notifying a size of DCI. The DCI carries power saving information of one or more users.

At block 302, the base station transmits the DCI according to the first indication signaling. The power saving information is carried in a power saving signal in the DCI. For instance, the base station transmits the power saving signal according to the notified size of the DCI.

The size of the DCI includes an amount of bits occupied by the DCI or an amount of power-saving information carried in the DCI. The amount of bits and the amount of power-saving information are each in a correspondence relationship with an amount of users. In general, one user corresponds to one piece of power-saving information. Power-saving information of one user may be carried by three bits or other numbers of bits. Therefore, the amount of users can be indicated by indicating the amount of bits or the amount of power-saving information.

The power saving signal is transmitted via the DCI.

As an example, the base station can indicate the size of the DCI by using at least two bits.

For example, different numbers of bits may be pre-defined, and the amount of bits to be adopted can be indicated by indication signaling. Taking 2 bits used for indication as an example, the following shows an example in which 4 different sizes of DCI are pre-defined and 2 bits are used for indication.

| Indication bits | 00 | 01 | 10 | 11 |
| --- | --- | --- | --- | --- |
| Amount of users (or amount of bits) | Single user (or 3 bits) | 2 users (or 6 bits) | 4 users (or 12 bits) | 8 users (or 24 bits) |

In some implementations, the method includes the following. When the amount of users corresponding to the amount of bits or corresponding to the amount of power saving signals is single user, the base station can scramble a PDCCH by using a C-RNTI by default, which has been allocated to a terminal when the terminal enters an RRC-_connected state, or allocate an RNTI to scramble the PDCCH.

In other implementations, the method includes the following. When the amount of users corresponding to the amount of bits or corresponding to the amount of power saving signals is multiple users, the base station can allocate an RNTI to scramble the PDCCH. For instance, when the amount of uses is more than one, the base station allocates a RNTI, and the RNTI is used for scrambling the DCI.

In some implementations, the method includes the following. The base station can indicate a location of power-saving information of a user in the DCI through the first indication signaling.

In some implementations, the method includes the following. The base station can indicate a function of the power saving signal, where the function of the power saving signal includes at least one of: waking up the terminal, indicating a target bandwidth used by the terminal, and indicating configuration information of a PDCCH search space.

An indication of the size of the DCI described in this implementation may be performed synchronously with operations at block 201 illustrated in FIG. 2, or may be performed separately. When indicating the type of the power saving signal by the first indication signaling, the base station may implicitly indicate the type of the power saving signal through operations at block 301. For example, when indicating the size of the DCI, if the first indication signaling indicates that the amount of bits occupied by the DCI is 3 bits, or indicates that the amount of power saving signals carried in the DCI is 1, the type of the power saving signal is the first PDCCH-based power saving signal; if the first indication signaling indicates that the amount of bits occupied by the DCI is 6 bits, or indicates that the amount of power saving signals carried in the DCI is greater than 1 (such as 2), the type of the power saving signal is the second PDCCH-based power saving signal. In this scenario, operations at block 201 can be omitted.

An indication of the size of the DCI, allocation of an RNTI, an indication of a location of multi-user power-saving information in the DCI, and an indication of the function of the power saving signal may be implemented by adopting the first indication signaling used for indicating the type of the power saving signal, or by adopting other signaling, and implementations of the disclosure are not limited in this regard. When the same indication signaling is adopted, a single piece of signaling is high in capacity and high in indication efficiency. When different pieces of signaling are adopted respectively, a single piece of signaling is low in capacity and low in indication efficiency, but is high in processing speed. Therefore, different manners may be selectively adopted according to user requirements and system load.

In addition, in this implementation, operations at block 301 may be executed separately, or may be executed in sequence with other operations, and implementations of the disclosure are not limited in this regard.

According to this implementation, the base station can flexibly determine the size of the DCI of a PDCCH-based power saving signal according to system load and/or the amount of terminals. As such, power saving signal transmission for different numbers of terminals can be achieved, which is possible to make full use of advantages of various manners in different scenarios and avoid disadvantages, thereby achieving optimized transmission of power-saving information.

Figure 4:
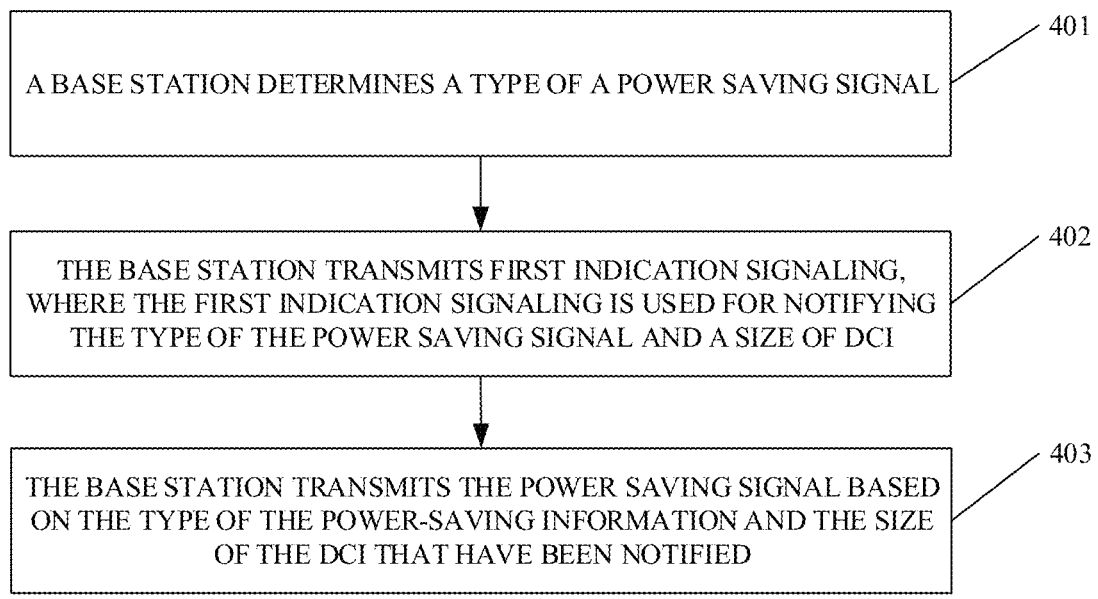
FIG. 4 is a schematic flowchart of a method for power saving signal transmission provided in other implementations of the disclosure.

FIG. 4 is a schematic flowchart of a method for power saving signal transmission provided in other implementations of the disclosure. The method includes the following.

At block 401, a base station transmits first indication signaling.

The first indication signaling is used for notifying a type of a power saving signal and a size of DCI.

The type of the power saving signal includes a first PDCCH-based power saving signal used for transmitting power-saving information of a single user and a second PDCCH-based power saving signal used for transmitting power-saving information of multiple users.

The size of the DCI includes an amount of bits occupied by the DCI or an amount of power-saving information carried in the DCI. The amount of bits and the amount of power-saving information are each in a correspondence relationship with an amount of users.

The power saving signal is transmitted via the DCI.

For example, when the type of the power saving signal is the first PDCCH-based power saving signal, an indication of the size of the DCI may be omitted. Alternatively, when some other bits in the DCI are further used for carrying other information, these bits can also be used for indicating the size of the DCI.

When the type of the power saving signal is the second PDCCH-based power saving signal, the size of the DCI can also be indicated, for example, the amount of bits occupied by the DCI or the amount of power-saving information carried in the DCI can be indicated. In addition, a location of power-saving information of a user in the DCI can also be indicated.

At block 402, the base station transmits the power saving signal based on the type of the power-saving information and the size of the DCI that have been notified.

In this implementation, the first indication signaling can be used to indicate both the type of the power saving signal and the size of the DCI, such that the base station can transmit the power saving signal according to the first indication signaling. For details thereof, reference can be made to implementations of indicating only the type of the power saving signal illustrated in FIG. 2 and implementations of indicating only the size of the DCI illustrated in FIG. 3, which will not be repeated herein.

Figure 5:
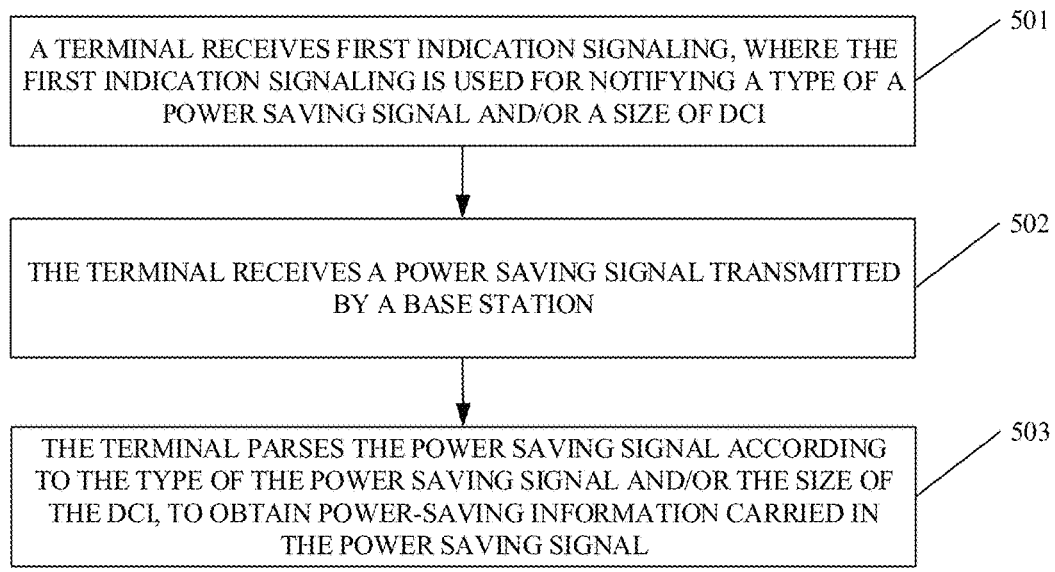
FIG. 5 is a schematic flowchart of a method for power saving signal transmission provided in other implementations of the disclosure.

FIG. 5 is a schematic flowchart of a method for power saving signal transmission provided in other implementations of the disclosure. The method includes the following.

At block 501, a terminal receives first indication signaling.

The first indication signaling is used for notifying a type of a power saving signal and/or a size of DCI. The DCI carries power saving information of one or more users.

The type of the power saving signal includes a first PDCCH-based power saving signal used for transmitting power-saving information of a single user and a second PDCCH-based power saving signal used for transmitting power-saving information of multiple users.

The size of the DCI includes an amount of bits occupied by the DCI or an amount of power-saving information carried in the DCI. The amount of bits and the amount of power-saving information are each in a correspondence relationship with an amount of users.

The power saving signal is transmitted via the DCI.

In some implementations, the first indication signaling includes broadcast signaling, RRC dedicated signaling, or MAC CE signaling.

In some implementations, the type of the power saving signal can be indicated by at least one bit in the first indication signaling.

In some implementations, the method further includes the following. When the type of the power saving signal is the first PDCCH-based power saving signal, the terminal descrambles a PDCCH by using a C-RNTI that has been allocated to the terminal, or descrambles the PDCCH by using an RNTI allocated by a base station.

In other implementations, the method further includes the following. When the type of the power saving signal is the second PDCCH-based power saving signal, the terminal descrambles the PDCCH by using an RNTI allocated by the base station.

In some implementations, the method further includes the following. When the type of the power saving signal is the second PDCCH-based power saving signal, the terminal obtains a location of power-saving information of the terminal in the DCI according to an indication of the base station.

In some implementations, the method further includes the following. When the amount of users corresponding to the amount of bits or corresponding to the amount of power-saving information is single user, the terminal descrambles the PDCCH by using a C-RNTI that has been allocated to the terminal, or receives an RNTI allocated by the base station to descramble the PDCCH.

In other implementations, the method further includes the following. When the amount of users corresponding to the amount of bits or corresponding to the amount of power-saving information is multiple users, the terminal receives an RNTI allocated by the base station for descrambling the PDCCH. For instance, when the amount of users is more than one, the terminal receives an RNTI allocated by the base station, and the RNTI is used for descrambling the DCI.

In some implementations, the method further includes the following. The terminal obtains a location of power-saving information of the terminal in the DCI according to the first indication signaling.

In some implementations, the method further includes the following. When the terminal fails to receive the first indication signaling, the terminal adopts a preset type of power saving signal and/or a preset size of DCI.

Operations performed by the terminal at block 501 basically correspond to the operations performed at the base station side illustrated in FIG. 2 to FIG. 4. For details thereof, reference can be made to descriptions of implementations illustrated in FIG. 2 to FIG. 4, which will not be repeated herein.

At block 502, the terminal receives a power saving signal transmitted by the base station. Specifically, the terminal receives the DCI according to the first indication signaling, and the power saving information is carried in a power saving signal in the DCI.

At block 503, the terminal obtains a function of the power saving signal according to the first indication signaling. For instance, the terminal parses the power saving signal according to the type of the power saving signal and/or the size of the DCI, to obtain power-saving information carried in the power saving signal.

A function of the power saving signal may include, but is not limited to, waking up the terminal, indicating a target bandwidth used by the terminal, and indicating configuration information of a PDCCH search space.

Therefore, by parsing the power saving signal, the terminal can obtain wake-up information, the target bandwidth, the configuration information of the PDCCH search space, or the like carried in the power saving signal.

Figure 6:
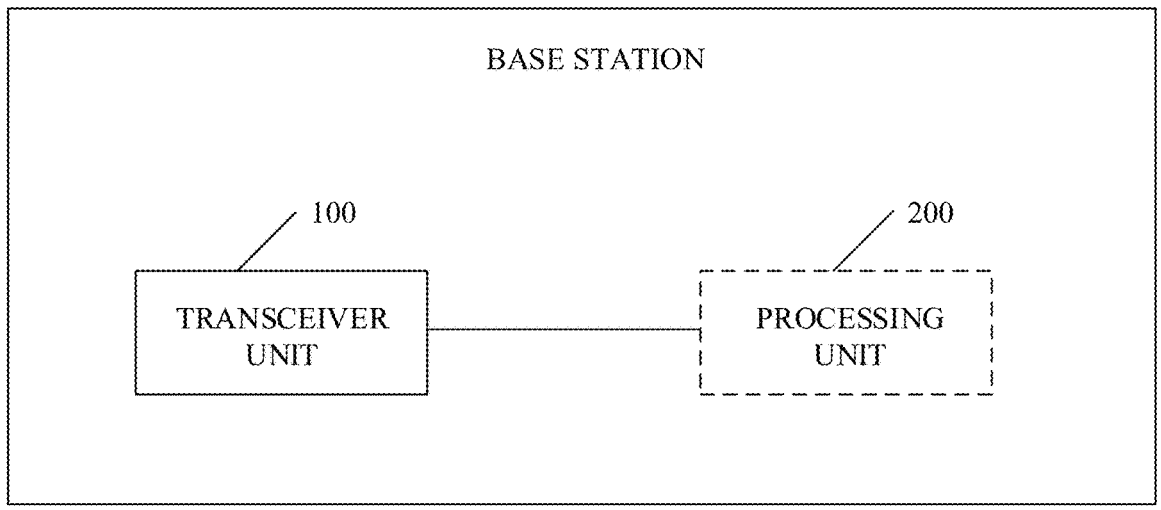
FIG. 6 is a schematic diagram illustrating components of a base station provided in implementations of the disclosure.

FIG. 6 is a schematic diagram illustrating components of a base station provided in implementations of the disclosure. In this implementation, the base station includes a transceiver unit 100. The transceiver unit 100 is configured to transmit first indication signaling, where the first indication signaling is used for notifying a type of a power saving signal and/or a size of DCI. The type of the power saving signal includes a first PDCCH-based power saving signal used for transmitting power-saving information of a single user and a second PDCCH-based power saving signal used for transmitting power-saving information of multiple users. The size of the DCI includes an amount of bits occupied by the DCI or an amount of power-saving information carried in the DCI, and the amount of bits and the amount of power-saving information are in a correspondence relationship with an amount of users.

In some implementations, the first indication signaling includes broadcast signaling, RRC dedicated signaling, or MAC CE signaling.

In some implementations, at least one bit in the first indication signaling is indicative of the type of the power saving signal.

In some implementations, the base station further includes a processing unit 200. The processing unit 200 is configured to scramble a PDCCH by using a C-RNTI that has been allocated to a terminal, or allocate an RNTI to scramble the PDCCH, when the type of the power saving signal is the first PDCCH-based power saving signal.

In other implementations, the processing unit 200 is configured to allocate an RNTI to scramble the PDCCH, when the type of the power saving signal is the second PDCCH-based power saving signal.

In some implementations, the processing unit 200 is configured to indicate a location of power-saving information of a user in the DCI.

In some implementations, the processing unit 200 is configured to scramble the PDCCH by using a C-RNTI that has been allocated to the terminal, or allocate an RNTI to scramble the PDCCH, when the amount of users corresponding to the amount of bits or corresponding to the amount of power-saving information is single user.

In other implementations, the processing unit 200 is configured to allocate an RNTI to scramble the PDCCH, when the amount of users corresponding to the amount of bits or corresponding to the amount of power-saving information is multiple users.

In some implementations, the processing unit 200 is configured to indicate a location of power-saving information of a user in the DCI.

In some implementations, the processing unit 200 is configured to indicate a function of the power saving signal, where the function of the power saving signal includes at least one of: waking up the terminal, indicating a target bandwidth used by the terminal, and indicating configuration information of a PDCCH search space.

In some implementations, the transceiver unit is further configured to perform at least one of the following. The transceiver unit is configured to transmit the power saving signal based on a preset type of power saving signal, when the base station fails to notify the type of the power saving signal. The transceiver unit is configured to transmit the power saving signal based on a preset size of DCI, when the base station fails to notify the size of the DCI.

For details of the concepts related to the technical solutions of implementations of the disclosure related to the base station and other steps, reference can be made to related descriptions in the foregoing method implementations, which will not be repeated herein.

Figure 7:
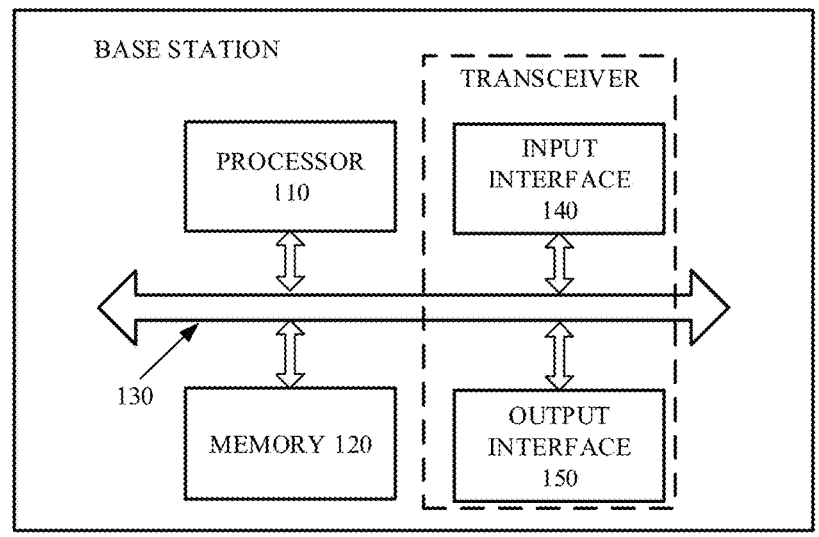
FIG. 7 is a schematic diagram illustrating components of a base station provided in other implementations of the disclosure.

FIG. 7 is a schematic diagram illustrating components of a base station provided in other implementations of the disclosure. As illustrated in FIG. 7, the base station includes a processor 110, a memory 120, and a bus 130. The processor 110 is coupled with the memory 120 via the bus 130. The memory 120 is configured to store instructions. The processor 110 is configured to execute the instructions stored in the memory 120, to perform the methods illustrated in FIG. 2 to FIG. 4.

The base station may further include an input interface 140 and an output interface 150. The processor 110, the memory 120, the input interface 140, and the output interface 150 can be coupled together via the bus 130.

The processor 110 is configured to execute the instructions stored in the memory 120, to control the output interface 150 to transmit to a terminal first indication signaling which is used for notifying the terminal of a type of a power saving signal and/or a size of DCI. The processor 110 is further configured to control the input interface 140 to receive a message transmitted by the terminal, to complete operations performed by the base station in the foregoing methods. The input interface 140 and the output interface 150 may be implemented as the same physical entity, or may be implemented as different physical entities. When implemented as the same physical entity, the input interface 140 and the output interface 150 can be collaboratively referred to as an input-output interface. The memory 120 may be integrated into the processor 110, or may be separate from the processor 110.

As an example, functions of the input interface 140 and functions of the output interface 150 can be implemented by a transceiver circuit or a transceiver dedicated chip. For instance, the input interface 140 and the output interface 150 can be implemented as part of or integrated into a transceiver. The processor 110 may be implemented by a dedicated processing chip, a processing circuit, a processor, or a general-purpose chip.

In this case, the memory of the base station stores executable instructions which, when executed by the processor, become operational with the transceiver to: transmit first indication signaling, where the first indication signaling is used for notifying a size of downlink control information (DCI), the DCI carries power saving information of one or more users, the size of the DCI includes an amount of bits occupied by the DCI, and the amount of bits and has a correspondence relationship with an amount of users; transmit the DCI.

In some implementations, amount of power saving information carried in the DCI has a correspondence relationship with the amount of users.

In some implementations, the one or more users each correspond to one piece of power saving information.

In some implementations, the first indication signaling includes radio resource control (RRC) dedicated signaling.

In some implementations, the amount of users is more than one, and the executable instructions, when executed by the processor, become operational with the processor to: allocate an RNTI, where the RNTI is used for scrambling the DCI.

In some implementations, the executable instructions, when executed by the processor, become operational with the processor to: indicate a location of power-saving information of a user in the DCI through the first indication signaling.

In some implementations, the power saving information is carried in a power saving signal in the DCI.

In some implementations, the executable instructions, when executed by the processor, become operational with the processor to: indicate a function of the power saving signal through the first indication signaling. The function of the power saving signal includes at least one of: waking up a terminal; and indicating a target bandwidth used by the terminal.

As another example, the base station provided in implementations of the disclosure may be implemented by a general-purpose computer, that is, program codes for implementing functions of the processor 110, functions of the input interface 140, and functions of the output interface 150 are stored in the memory. A general-purpose processor can implement functions of the processor 110, functions of the input interface 140, and functions of the output interface 150 by executing the codes stored in the memory.

For details and other steps of the concepts related to the technical solutions of implementations of the disclosure related to the base station, reference can be made to related descriptions in the foregoing method implementations or other implementations, which will not be repeated herein.

Figure 8:
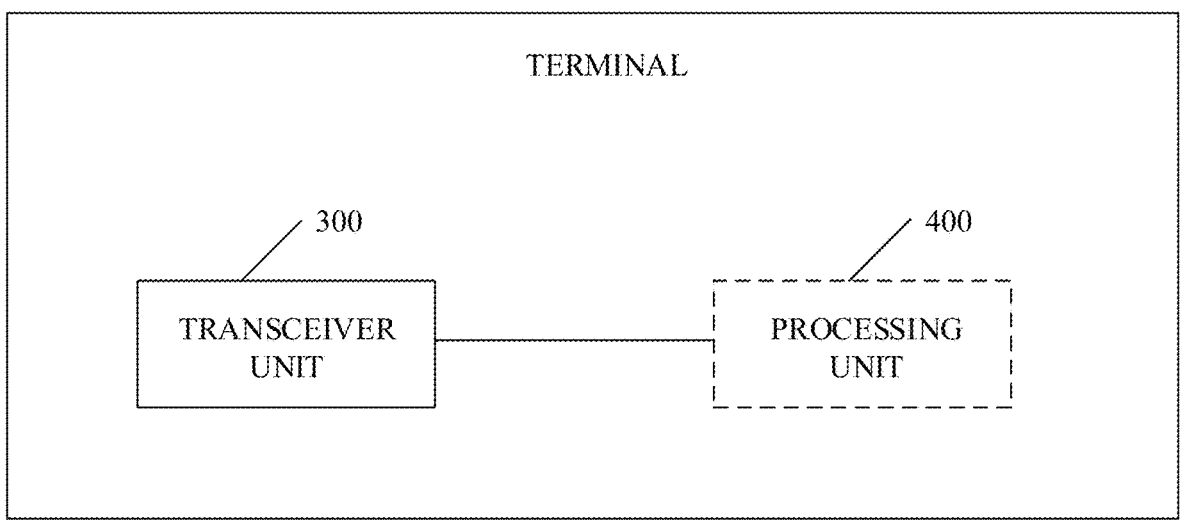
FIG. 8 is a schematic diagram illustrating components of a terminal provided in implementations of the disclosure.

FIG. 8 is a schematic diagram illustrating components of a terminal provided in implementations of the disclosure. In this implementation, the terminal includes a transceiver unit 300. The transceiver unit 300 is configured to receive first indication signaling, where the first indication signaling is used for notifying a type of a power saving signal and/or a size of DCI. The type of the power saving signal includes a first PDCCH-based power saving signal used for transmitting power-saving information of a single user and a second PDCCH-based power saving signal used for transmitting power-saving information of multiple users. The size of the DCI includes an amount of bits occupied by the DCI or an amount of power-saving information carried in the DCI, and the amount of bits and the amount of power-saving information are in a correspondence relationship with an amount of users. The transceiver unit 300 is further configured to receive the power saving signal transmitted via the DCI.

In some implementations, the first indication signaling includes broadcast signaling, RRC dedicated signaling, or MAC CE signaling.

In some implementations, at least one bit in the first indication signaling is indicative of the type of the power saving signal.

In some implementations, the terminal further includes a processing unit 400. The processing unit 400 is configured to descramble a PDCCH by using a C-RNTI that has been allocated to the terminal, or descramble the PDCCH by using an RNTI allocated by a base station, when the type of the power saving signal is the first PDCCH-based power saving signal.

In other implementations, the processing unit 400 is configured to descramble the PDCCH by using an RNTI allocated by the base station, when the type of the power saving signal is the second PDCCH-based power saving signal.

In some implementations, the processing unit 400 is configured to obtain a location of power-saving information of the terminal in the DCI according to an indication of the base station.

In some implementations, the processing unit 400 is configured to descramble the PDCCH by using a C-RNTI that has been allocated to the terminal, or descramble the PDCCH by using an RNTI allocated by the base station, when the amount of users corresponding to the amount of bits or corresponding to the amount of power-saving information is single user.

In other implementations, the processing unit 400 is configured to descramble the PDCCH by using an RNTI allocated by the base station, when the amount of users corresponding to the amount of bits or corresponding to the amount of power-saving information is multiple users.

In some implementations, the processing unit 400 is configured to obtain a location of power-saving information of the terminal in the DCI according to an indication of the base station.

In some implementations, the processing unit 400 is configured to obtain a function of the power saving signal according to an indication of the base station, where the function of the power saving signal includes at least one of: waking up the terminal, indicating a target bandwidth used by the terminal, and indicating configuration information of a PDCCH search space.

In some implementations, the processing unit 400 is configured to adopt a preset type of power saving signal and/or a preset size of DCI, when the transceiver unit 300 fails to receive the first indication signaling.

For details and other steps of the concepts related to the technical solutions of implementations of the disclosure related to the terminal, reference can be made to related descriptions in the foregoing method implementations, which will not be repeated herein.

Figure 9:
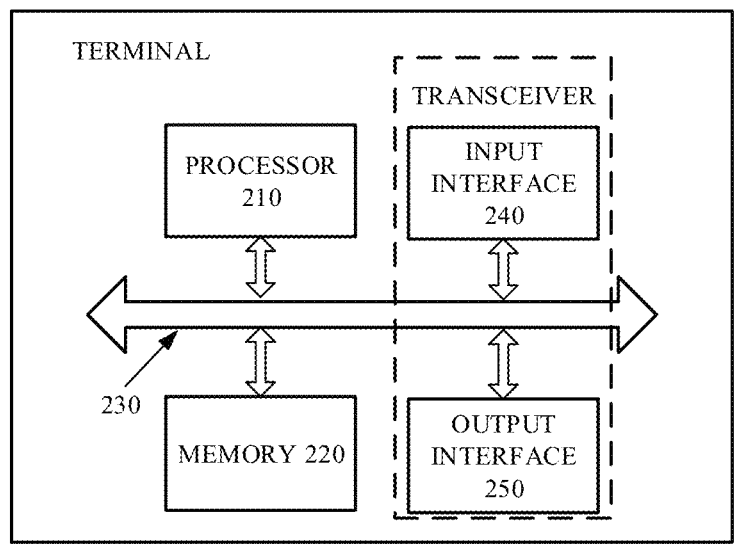
FIG. 9 is a schematic diagram illustrating components of a terminal provided in other implementations of the disclosure.

FIG. 9 is a schematic diagram illustrating components of a terminal provided in other implementations of the disclosure. As illustrated in FIG. 9, the terminal includes a processor 210, a memory 220, and a bus 230. The processor 210 is coupled with the memory 220 via the bus 230. The memory 220 is configured to store instructions. The processor 210 is configured to execute the instructions stored in the memory 220, to perform the methods illustrated in FIG. 5.

The base station may further include an input interface 240 and an output interface 250. The processor 210, the memory 220, the input interface 240, and the output interface 250 can be coupled together via the bus 230.

The processor 210 is configured to execute the instructions stored in the memory 220, to control the input interface 240 to receive first indication signaling. The processor 210 is further configured to control the input interface 240 to receive a power saving signal transmitted by a base station, and control the output interface 250 to transmit a message to the base station, to complete operations performed by the terminal in the foregoing method. The input interface 240 and the output interface 250 may be implemented as the same physical entity, or may be implemented as different physical entities. When implemented as the same physical entity, the input interface 240 and the output interface 250 can be collaboratively referred to as an input-output interface. The memory 220 may be integrated into the processor 210, or may be separate from the processor 210.

As an example, functions of the input interface 240 and functions of the output interface 250 can be implemented by a transceiver circuit or a transceiver dedicated chip. For instance, the input interface 240 and the output interface 250 can be implemented as part of or integrated into a transceiver. The processor 210 may be implemented by a dedicated processing chip, a processing circuit, a processor, or a general-purpose chip.

In this case, the memory of the terminal stores executable instructions which, when executed by the processor, become operational with the transceiver to: receive first indication signaling, where the first indication signaling is used for notifying a size of downlink control information (DCI), the DCI carries power saving information of one or more users, the size of the DCI includes an amount of bits occupied by the DCI, and the amount of bits has a correspondence relationship with an amount of users; receive the DCI according to the first indication signaling.

In some implementations, an amount of power saving information carried in the DCI has a correspondence relationship with the amount of users.

In some implementations, the one or more users each correspond to one piece of power saving information.

In some implementations, the first indication signaling includes radio resource control (RRC) dedicated signaling.

In some implementations, the amount of users is more than one, and the executable instructions, when executed by the processor, become operational with the transceiver to: receive an RNTI allocated by a base station, where the RNTI is used for descrambling the DCI.

In some implementations, the executable instructions, when executed by the processor, become operational with the processor to: obtain a location of power-saving information of the terminal in the DCI according to the first indication signaling.

In some implementations, the power saving information is carried in a power saving signal in the DCI.

In some implementations, the executable instructions, when executed by the processor, become operational with the processor to: obtain a function of the power saving signal according to the first indication signaling. The function of the power saving signal includes at least one of: waking up the terminal; and indicating a target bandwidth used by the terminal.

As another example, the terminal provided in implementations of the disclosure may be implemented by a general-purpose computer, that is, program codes for implementing functions of the processor 210, functions of the input interface 240, and functions of the output interface 250 are stored in the memory. A general-purpose processor can implement functions of the processor 210, functions of the input interface 240, and functions of the output interface 250 by executing the codes stored in the memory.

For details and other steps of the concepts related to the technical solutions of implementations of the disclosure related to the terminal, reference can be made to related descriptions in the foregoing method implementations or other implementations, which will not be repeated herein.

Those skilled in the art can understand that, for the convenience of description, FIG. 7 and FIG. 9 each illustrate only one memory and one processor. In practice, there may be multiple processors and memories. The memory may also be referred to as a storage medium or a storage device, and the disclosure is not limited in this regard. According to implementations, the processor may be a central processing unit (CPU), or may be other general-purpose processors, a digital signal processor (DSP), an application specific integrated circuit (ASIC), a field programmable gate array (FPGA), or other programmable logic devices, discrete gates or transistor logic devices, or discrete hardware components. The general-purpose processor may be a microprocessor, or the processor may be any conventional processor or the like. The memory may include a read only memory (ROM) and a random access memory (RAM), and can provide instructions and data to the processor. A portion of the memory may also include non-volatile RAM. In addition to a data bus, the bus may further include a power bus, a control bus, a status signal bus, and the like. However, for the sake of clarity, various buses are collaboratively marked as the bus in the accompanying drawings.

Based on the terminal and the base station provided herein, implementations further provide a communication system. The communication system includes a terminal and a base station. For details of a relationship therebetween and operations performed by the terminal and the base station, reference can be made to descriptions in implementations illustrated in FIG. 1 to FIG. 4, which will not be repeated herein.

The terms "system" and "network" herein are usually used interchangeably throughout this disclosure. The terms "user" and "terminal" herein can also be used interchangeably throughout this disclosure. It should be understood that, the term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

According to implementations, "B corresponding to A" means that B is associated with A, and B can be determined according to A. However, "B can be determined according to A" does not mean that B can only be determined according to A, and instead, B can be determined according to A and/or other information.

It should be understood that, in various implementations described herein, the magnitude of a sequence number of each process does not mean an order of execution, and the order of execution of each process should be determined by its function and an internal logic and shall not constitute any limitation to an implementation process of implementations.

Those of ordinary skill in the art will appreciate that various illustrative logical blocks and steps described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

All or part of the above implementations can be implemented through software, hardware, firmware, or any other combination thereof. When implemented by software, all or part of the above implementations can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for power saving signal transmission, comprising:
    transmitting, by a base station, first indication signaling, wherein the first indication signaling is used for notifying a size of downlink control information (DCI), the DCI carries power saving information of one or more users, the size of the DCI comprises an amount of bits occupied by the DCI, and the amount of bits has a correspondence relationship with an amount of users; and
    transmitting the DCI by the base station according to the first indication signaling;
    wherein the method further comprises:
        determining, by the base station, a type of a power saving signal based on system load or an amount of users, wherein the type of the power saving signal comprises a first physical downlink control channel, PDCCH, based power saving signal and a second PDCCH-based power saving signal, wherein the first PDCCH-based power saving signal is used for transmitting power-saving information of a single user and the second PDCCH-based power saving signal is used for transmitting power-saving information of multiple users; wherein the first indication signaling is further used for notifying the type of the power saving signal determined.

2. The method of claim 1, wherein an amount of power saving information carried in the DCI has a correspondence relationship with the amount of users.

3. The method of claim 1, wherein the one or more users each correspond to one piece of power saving information.

4. The method of claim 1, wherein the first indication signaling comprises radio resource control (RRC) dedicated signaling.

5. The method of claim 1, wherein the amount of users is more than one, the method further comprises:
    allocating an RNTI by the base station, wherein the RNTI is used for scrambling the DCI.

6. The method of claim 1, further comprising:
    indicating, by the base station, a location of power-saving information of a user in the DCI through the first indication signaling.

7. The method of claim 1, wherein the power saving information is carried in a power saving signal in the DCI.

8. The method of claim 7, further comprising:
    indicating, by the base station, a function of the power saving signal through the first indication signaling;
    wherein the function of the power saving signal comprises at least one of:
        waking up a terminal; and
        indicating a target bandwidth used by the terminal.

9. A method for power saving signal transmission, comprising:
    receiving, by a terminal, first indication signaling, wherein the first indication signaling is used for notifying a size of downlink control information (DCI), the DCI carries power saving information of one or more users, the size of the DCI comprises an amount of bits occupied by the DCI, and the amount of bits has a correspondence relationship with an amount of users; and
    receiving, by the terminal, the DCI according to the first indication signaling;
    wherein, the first indication signaling is further used for notifying a type of a power saving signal; wherein the type of the power saving signal is based on system load or an amount of users, wherein the type of the power saving signal comprises a first physical downlink control channel, PDCCH, based power saving signal and a second PDCCH-based power saving signal, wherein the first PDCCH-based power saving signal is used for transmitting power-saving information of a single user and the second PDCCH-based power saving signal is used for transmitting power-saving information of multiple users.

10. The method of claim 9, wherein an amount of power saving information carried in the DCI has a correspondence relationship with the amount of users.

11. The method of claim 9, wherein the one or more users each correspond to one piece of power saving information.

12. The method of claim 9, wherein the first indication signaling comprises radio resource control (RRC) dedicated signaling.

13. The method of claim 9, wherein the amount of users is more than one, the method further comprises:
    receiving, by the terminal, an RNTI allocated by a base station, wherein the RNTI is used for descrambling the DCI.

14. The method of claim 9, further comprising:
obtaining, by the terminal, a location of power-saving information of the terminal in the DCI according to the first indication signaling.

15. The method of claim 9, wherein the power saving information is carried in a power saving signal in the DCI.

16. The method of claim 15, further comprising:
obtaining, by the terminal, a function of the power saving signal according to the first indication signaling;
wherein the function of the power saving signal comprises at least one of:
waking up the terminal; and
indicating a target bandwidth used by the terminal.

17. A base station, comprising:
a transceiver;
a processor; and
a memory that stores executable instructions which, when executed by the processor, become operational with the transceiver to:
transmit first indication signaling, wherein the first indication signaling is used for notifying a size of downlink control information (DCI), the DCI carries power saving information of one or more users, the size of the DCI comprises an amount of bits occupied by the DCI, and the amount of bits and has a correspondence relationship with an amount of users; and
transmit the DCI according to the first indication signaling;
wherein the executable instructions, when executed by the processor, become operational with the processor to:
determine a type of a power saving signal based on system load or an amount of users, wherein the type of the power saving signal comprises a first physical downlink control channel, PDCCH, based power saving signal and a second PDCCH-based power saving signal, wherein the first PDCCH-based power saving signal is used for transmitting power-saving information of a single user and the second PDCCH-based power saving signal is used for transmitting power-saving information of multiple users; wherein the first indication signaling is further used for notifying the type of the power saving signal determined.

18. The base station of claim 17, wherein an amount of power saving information carried in the DCI has a correspondence relationship with the amount of users.

19. The base station of claim 17, wherein the amount of users is more than one, the executable instructions, when executed by the processor, become operational with the processor to:
allocate an RNTI, wherein the RNTI is used for scrambling the DCI.

20. The base station of claim 17, wherein the amount of users is more than one, the executable instructions, when executed by the processor, become operational with the processor to:
indicate a location of power-saving information of a user in the DCI through the first indication signaling.

21. The base station of claim 17, wherein the power saving information is carried in a power saving signal in the DCI.

22. The base station of claim 21, wherein the executable instructions, when executed by the processor, become operational with the processor to:
indicate a function of the power saving signal through the first indication signaling, wherein the function of the power saving signal comprises at least one of:
waking up a terminal; and
indicating a target bandwidth used by the terminal.

23. A terminal, comprising:
a transceiver;
a processor; and
a memory that stores executable instructions, which when executed by the processor, become operational with the transceiver to:
receive first indication signaling, wherein the first indication signaling is used for notifying a size of downlink control information (DCI), the DCI carries power saving information of one or more users, the size of the DCI comprises an amount of bits occupied by the DCI, and the amount of bits has a correspondence relationship with an amount of users; and
receive the DCI according to the first indication signaling;
wherein the first indication signaling is further used for notifying a type of a power saving signal; wherein the type of the power saving signal is based on system load or an amount of users, wherein the type of the power saving signal comprises a first physical downlink control channel, PDCCH, based power saving signal and a second PDCCH-based power saving signal, wherein the first PDCCH-based power saving signal is used for transmitting power-saving information of a single user and the second PDCCH-based power saving signal is used for transmitting power-saving information of multiple users.

24. The terminal of claim 23, wherein the one or more users each correspond to one piece of power saving information.

25. The terminal of claim 23, wherein the first indication signaling comprises radio resource control (RRC) dedicated signaling.

* * * * *